United States Patent [19]

Burkhardt

[11] 4,165,564
[45] Aug. 28, 1979

[54] ENCAPSULATED MEASURING DEVICE
[75] Inventor: Horst Burkhardt, Truchtlaching, Fed. Rep. of Germany
[73] Assignee: Dr. Johannes Heidenhain GmbH, Traunreut, Fed. Rep. of Germany
[21] Appl. No.: 883,784
[22] Filed: Mar. 6, 1978
[30] Foreign Application Priority Data
Mar. 19, 1977 [DE] Fed. Rep. of Germany ....... 2712096
[51] Int. Cl.$^2$ .......................... G01B 11/00; G01B 5/00
[52] U.S. Cl. .............................. 33/125 C; 250/237 G; 356/373
[58] Field of Search .............................. 92/88; 244/63; 250/237 G; 356/169, 172, 170, 373, 374; 33/125 R, 125 C, 125 A, 125 T, 76 R, 79 R, 1 M; 105/155; 104/89, 94

[56] References Cited
U.S. PATENT DOCUMENTS

| 2,170,296 | 8/1939 | Frank | 105/155 |
|---|---|---|---|
| 3,049,217 | 8/1962 | Parker et al. | 104/94 |
| 4,031,595 | 6/1977 | Welker | 356/169 |

Primary Examiner—Charles E. Phillips
Assistant Examiner—John W. Shepperd
Attorney, Agent, or Firm—Hume, Clement, Brinks, Willian & Olds, Ltd.

[57] ABSTRACT

An encapsulated measuring device is described which includes a hollow body, a scale defining a measuring direction, and a sensing unit disposed to move along the scale within the hollow body. An entrainment member is pivotably secured to the sensing unit and extends out of the hollow body. Sealing members provide a seal between the movable entrainment member and the hollow body, and these sealing members protrude beyond the hollow body so that liquid in the hollow body can flow down onto the sealing members and out of the hollow body through openings between the sealing members and the entrainment member. Because the pivotable articulation allows the entrainment member to be adjusted with respect to the sensing unit, the angle at which the entrainment member protrudes from the hollow body may be adjusted according to the requirements of the individual installations. The configuration of the sealing members allows fluid to drain from the hollow body for a range of orientations of the entrainment member.

4 Claims, 3 Drawing Figures

ENCAPSULATED MEASURING DEVICE

BACKGROUND OF THE INVENTION

The present invention relates to an encapsulated measuring device which is usable in several mounting positions and comprises a scale and a sensing unit, which are placed in a hollow body for environmental protection. The hollow body defines an aperture, and an entrainment means secured to the sensing unit extends through the aperture. Sealing members are provided which substantially seal the aperture around the entrainment means. The sealing members are so arranged that for a range of mounting position of the installation the effective sealing surface between adjacent sealing members is lower than the inner surfaces of the shaft formed by the hollow body.

Encapsulated measuring devices of the afore-mentioned type are so designed that even in mounting positions rotated by 90° in relation to each other, liquid contained in the hollow body can flow off without impediment through fine gaps at the effective sealing surfaces of the sealing lips.

SUMMARY OF THE INVENTION

The present invention is directed to an advantageous improvement of such encapsulated measuring devices. According to this invention the entrainment means is articulated at least transversely to the measurement direction so that the angle of inclination of the entrainment means which extends through the afore-mentioned sealing members is adjustable. Furthermore, the entrainment means is resistant to bending in the measurement direction.

The invention makes it possible to optimally adjust the position of the sealing members to the prevailing mounting position so that ingressing liquid can flow out of the hollow body through fine gaps between the sealing members and the entrainment means. Moreover, the invention greatly facilitates the mounting of the measuring device at the machine.

The invention, together with further objects and attendant advantages, will be best understood by reference to the following description taken in connection with the appended drawings.

DETAILED DESCRIPTION OF THE PREFERRED EMBODIMENT

Figure 1:
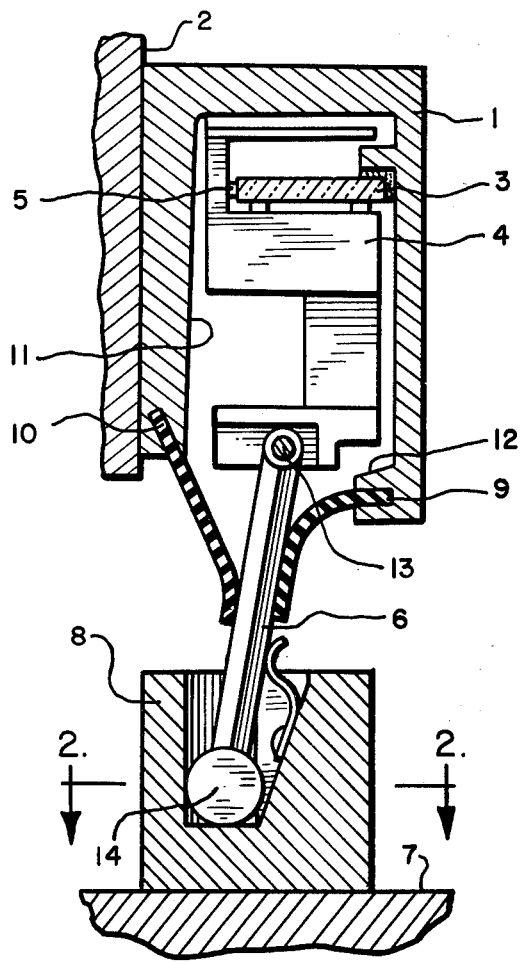
FIG. 1 is a sectional view of one embodiment of the encapsulated measuring device of the present invention.
Figure 3:
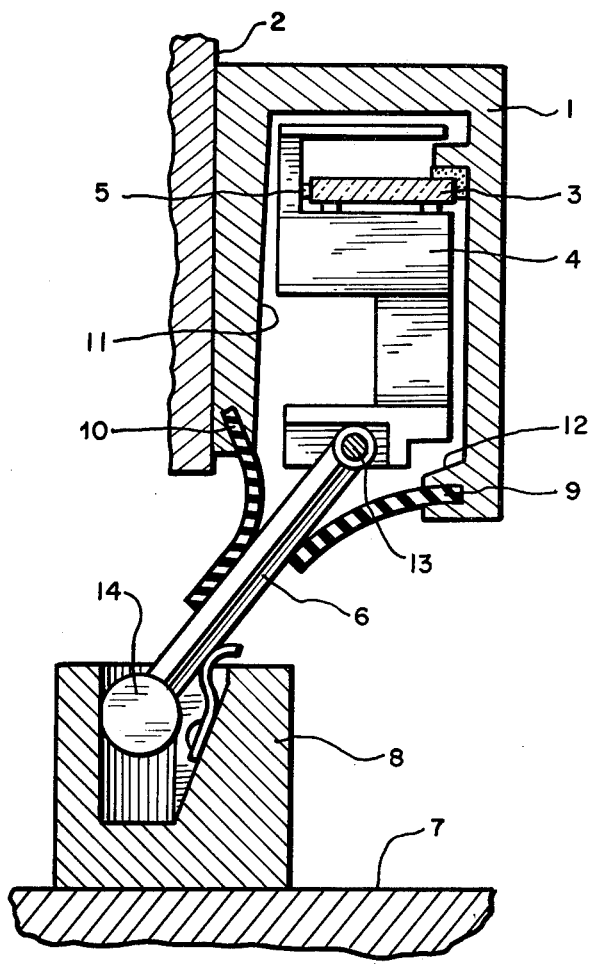
FIG. 3 is a second sectional view of the encapsulated measuring device of FIG. 1 showing the entrainment means in a second position.
Figure 2:
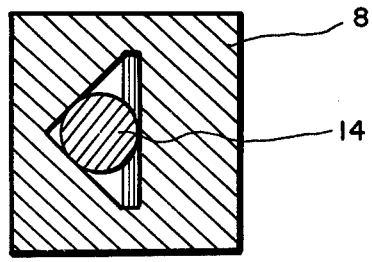
FIG. 2 is a sectional view along line A—A of FIG. 1.

Referring now to the drawings, the reference numeral 1 identifies a hollow body mounted to the bed 2 of a machine. The scale 3 is adhesively fastened to the hollow body 1. A sensing unit 4 is seated directly at the scale 3 by way of sliding shoes 5. The scale 3 and the sensing unit 4 of this embodiment are well-known in the art and will not be described in detail here.

An entrainment means 6 connects the sensing unit 4 to a machine carriage 7, whose displacement is to be measured. The entrainment means is preferably provided with an elongated, or sword-like cross-section, as taught by the prior art. The entrainment means 6 is fastened to the carriage 7 through a mounting leg 8.

The hollow body 1 defines an aperture which extends continuously along the length of the hollow body 1 in the measuring direction and transversely to the measuring direction as far as the inner wall 11 of the hollow body 1. The aperture is sealed by means of flexible sealing lips 9, 10 arranged roof-like. The sealing lips 9, 10 are arranged protrudingly in relation to the hollow body 1. According to the invention the entrainment means 6 which is resistant to bending in the measuring direction, is articulated transversely to the measurement direction. In the preferred embodiment, the entrainment means is articulated at the scanning unit 4 and the mounting leg 8. As a result of the adjustability of the entrainment means 6 via the pivot 13, and the articulation 14, it is possible, during the mounting of the measuring device, to optimally adjust the position of the gaps in the sealing lips 9, 10, through which ingressing liquid flows off. According to the invention the sealing lips 9, 10 are so set in each case that their effective sealing surface is lower, even in mounting positions turned by 90° in relation to each other, than the inner surfaces 11 or 12 of the shaft formed by the covered hollow body 1. In this way, liquid penetrating the hollow body can immediately flow off again through the gap between the sealing member 9, 10 and the sword-like entrainment means 6. The discharge of the ingressing liquid is further facilitated in that the thickness of the walls of the hollow body 1 to which the sealing members 9, 10 are fastened, decreases toward the aperture.

Of course, it should be understood that various modifications and changes to the preferred embodiment described above will be apparent to those skilled in the art. For example, the articulations 13, 14 could be replaced by leaf spring articulation. Such changes and modifications can be made without departing from the scope of the present invention and without diminishing its attendant advantages. It is, therefore, intended that such changes and modifications be covered by the following claims.

I claim:

1. In an encapsulated measuring device including a hollow body, a scale disposed within the hollow body and defining a measuring direction, a sensing unit disposed to move along the scale within the hollow body, entrainment means resistant to bending in the measuring direction and secured to the sensing unit so as to extend out of the hollow body, and sealing members defining an effective sealing surface between the hollow body and the entrainment means, said sealing members arranged so that the effective sealing surface extends beneath the lowermost portion of the inner surfaces of the hollow body for a predetermined range of mounting positions, the improvement comprising:

means for articulating the entrainment means transversely to the measuring direction to adjust the angle of inclination at which the entrainment means extends through the sealing members.

2. The improvement of claim 1 wherein the articulating means includes two articulations arranged to move transversely to the measuring direction.

3. In an encapsulated measuring device including a hollow body, a scale disposed within the hollow body and defining a measuring direction, a sensing unit disposed to move along the scale within the hollow body, entrainment means resistant to bending in the measuring direction and secured to the sensing unit so as to extend out of the hollow body, and sealing members defining an effective sealing surface between the hollow body and the entrainment means, said sealing members arranged so that the effective sealing surface extends beneath the lowermost portion of the inner surfaces of the hollow body for a predetermined range of mounting positions, the improvement comprising:

a first articulating joint included in the entrainment means for articulating the entrainment means transversely to the measuring direction, said joint operative to adjust the angle at which the entrainment means extends through the sealing members such that mounting the entrainment means to an object is facilitated for a plurality of mounting positions of said measuring device, and further, such that positioning the sealing members to promote drainage of a fluid contained within the hollow body out of the hollow body via spaces between the sealing members and the entrainment means is facilitated for a plurality of mounting positions of said measuring device.

4. The improvement of claim 3 further including a second articulating joint included in the entrainment means for articulating the entrainment means transversely to the measuring direction.

* * * * *